United States Patent
Lamaque et al.

(10) Patent No.: US 9,909,422 B2
(45) Date of Patent: Mar. 6, 2018

(54) REDUCED PRESSURE BALANCING OF A TURBINE ROTOR

(71) Applicant: ALSTOM Technology Ltd, Baden (CH)

(72) Inventors: Jerome Lamaque, Pontoise (FR); Xavier Laurent, Villepinte (FR)

(73) Assignee: General Electric Technology GmbH, Baden (CH)

( * ) Notice: Subject to any disclaimer, the term of this patent is extended or adjusted under 35 U.S.C. 154(b) by 756 days.

(21) Appl. No.: 13/934,632

(22) Filed: Jul. 3, 2013

(65) Prior Publication Data

US 2014/0010653 A1    Jan. 9, 2014

(30) Foreign Application Priority Data

Jul. 6, 2012 (FR) ...................... 12 56562

(51) Int. Cl.
*F01D 5/02* (2006.01)
*F16F 15/32* (2006.01)

(52) U.S. Cl.
CPC .............. *F01D 5/027* (2013.01); *F16F 15/32* (2013.01); *F05D 2220/31* (2013.01); *Y10T 29/49318* (2015.01); *Y10T 29/53* (2015.01)

(58) Field of Classification Search
CPC . F01D 5/027; F01D 5/10; F01D 25/04; F05D 2220/31; F05D 2260/96; F16F 15/32; F16F 15/322
USPC ........................................................ 416/144
See application file for complete search history.

(56) References Cited

U.S. PATENT DOCUMENTS

| | | | | |
|---|---|---|---|---|
| 4,236,425 A | * | 12/1980 | Bellati | F01D 5/027 464/180 |
| 6,279,420 B1 | | 8/2001 | Knorowski et al. | |
| 2012/0151937 A1 | * | 6/2012 | Muscat | F01D 5/027 60/805 |

FOREIGN PATENT DOCUMENTS

| CN | 201574782 U | 9/2010 |
|---|---|---|
| EP | 1602855 A2 | 12/2005 |
| FR | 2 630 496 | 10/1989 |
| FR | 2 939 470 | 6/2010 |
| KR | 200409972 | 3/2006 |

OTHER PUBLICATIONS

Allianz-Versicherungs-AG, Hanbook of Loss Prevention, 1978, Springer-Verlag Berlin Heidelberg, p. 152.*

* cited by examiner

*Primary Examiner* — Igor Kershteyn
*Assistant Examiner* — Brian P Wolcott
(74) *Attorney, Agent, or Firm* — GE Global Patent Operation; Cynthia W. Flanigan

(57) ABSTRACT

The present invention relates to a device for inserting a balancing weight into a rotor of a turbine, that includes an external component and an internal component. The internal component is connected in a helical manner to the external component. The internal component delimits a chamber which has a first and a second opening, a lower surface which is provided with a sealing joint and a cap in order to close in a tight manner the first opening of the chamber. The connection between the external component and the internal component is helical, that is to say, the result of a threading operation. Therefore, the internal component can thus move in a coaxial manner with respect to the external component.

11 Claims, 4 Drawing Sheets

REDUCED PRESSURE BALANCING OF A TURBINE ROTOR

CROSS-REFERENCE TO RELATED APPLICATIONS

This application claims priority to French Application 1256562 filed on Jul. 6, 2012, the contents of which are hereby incorporated by reference in its entirety.

TECHNICAL FIELD

The present invention relates to a system for balancing a turbine rotor.

During operation, typically in a nuclear power station, a low-pressure steam turbine rotor rotates at approximately 1500 rpm (revolutions per minute).

The different stresses to which the rotor is subjected may bring about an imbalance which generates vibrations which may have negative effects on the components of the turbine.

The balancing of the rotor is therefore controlled regularly in order to prevent any "imbalance" effect.

In order to overcome this, the rotor of a turbine generally has balancing holes which are arranged around the rotor and in which it is possible to insert one or more weights in order to reestablish the balance of the rotor.

Conventionally, in order to introduce these weights, it is necessary to stop the turbine and to open at least a portion of the housing of the turbine. Furthermore, in a low-pressure turbine whose exhaust functions under low pressure (that is to say, under a few millibar), it is also necessary to disrupt the reduced pressure when the housing is opened.

Air originating from the outer side at atmospheric pressure and being introduced may in the long term produce corrosion on some elements.

The operations relating to rebalancing the rotor of the turbine thus present problems involving complex and very long maintenance (in the order of three weeks). The weights are elements which measure some tens of centimeters and which weigh several kilograms (typically between 2 and 6 kg).

The present invention is intended to overcome at least some of these disadvantages by affording the possibility of intervention without disrupting the reduced pressure and in a more simple and rapid manner, having a minimal impact on the operation and the structure of the turbine.

DESCRIPTION

To this end, there is proposed, according to a first aspect of the invention, a device for inserting a balancing weight into a rotor of a turbine, comprising an external component, an internal component which is connected in a helical manner to the external component, the internal component delimiting a chamber which has a first and a second opening and comprising a lower surface which is provided with a sealing joint and a cap in order to close in a tight manner the first opening of the chamber. The connection between the external component and the internal component is helical, that is to say, the result of a threading operation. Therefore, the internal component can thus move in a coaxial manner with respect to the external component.

The term "cap" is intended to refer to any means which allows the first opening to be closed.

In this manner, after the device has been fixed to a turbine, when the device is disconnected, that is to say, when the internal component is in an upper position so as to be remote from the rotor, an internal environment of the turbine and the chamber are under reduced pressure (that is to say, below a few millibar), and it is desirable to preserve this reduced pressure when a weight is introduced.

To this end, the device is connected, that is to say that the internal component of the device is moved in translation by the rotation of the internal component in the external component on the helical connection so as to move into contact with the rotor of the turbine in the stopped state.

In order to best ensure a tight contact, it is preferable for the lower surface of the internal component which comes into contact with the rotor to be provided with a joint.

After the device has been connected, it is then possible to open the chamber in order to introduce a weight. The chamber is then under atmospheric pressure whilst the internal environment of the turbine remains under reduced pressure.

Preferably, the joint is planar and covers at least a portion of the lower surface around the second opening of the internal component, which allows a larger contact surface to be provided and thus allows the sealing to be improved.

According to an advantageous embodiment, the cap is retained on the first opening of the chamber by at least two screws which allows the cap to be unscrewed on the internal component in order to allow air to enter and place the chamber under, atmospheric pressure. Since the chamber is under reduced pressure, the pressure on the cap is significant, the action of the two screws allows the effort to be supplied to be limited.

According to a preferred embodiment, the device comprises at least one guiding member, in order to guide the internal component relative to the external component. In order to ensure effective guiding of the internal component in the external component, the member allows the internal component to remain in line with the external component and accordingly facilitates its movement from one position to another.

The helical connection is constituted by a nut which is capable of cooperating with the external component in order to guide the translation. The nut is arranged on a connection component and is kept fixed to the external component by means of a ring.

According to another aspect, the present invention also relates to a turbine which comprises at least one rotor which has at least one balancing hole and a device for inserting a balancing weight as defined above.

Advantageously, the device is fixed to an external housing of the turbine. A hole is then formed in the housing that it is also possible to close with a cover.

Preferably, the balancing hole is at least partially threaded whilst a portion of the profile of the weight is threaded. The weight is inserted by means of threading and is retained by means of caulking.

Finally, the present invention relates to a method for inserting a weight with a device for inserting a balancing weight as defined above, characterized in that it successively comprises the following steps:

the turbine is stopped;
the rotor is orientated so that a balancing hole is opposite the second opening of the chamber of the device;
using the nut, the device is connected to the rotor so that the surface provided with the sealing joint of the internal component is in contact with the rotor;
the chamber of the device is opened by acting on the two screws, by removing the cap which closes the first opening of the chamber, which fills the chamber with air;

the weight is introduced into the hole of the rotor via the chamber of the device and it is positioned by means of screwing, then it is locked in position by means of caulking in the balancing hole which co-operates with a thread which is present on the weight;

the cap is repositioned in order to close the first opening of the chamber;

the device is disconnected from the rotor with the nut;

the turbine is put back into operation.

The method may have additional steps. For example, if the device also has a nut, and/or a hole formed in the housing covered with a cover, it is then also necessary, where applicable, to remove the cover from the hole of the housing, then the nut before removing the cap; then to reposition the nut then the cover after having repositioned the cap.

The invention will be well understood and the advantages thereof appreciated more clearly from a reading of the following detailed description, given merely by way of non-limiting example, with reference to the appended drawings.

Figure 1:
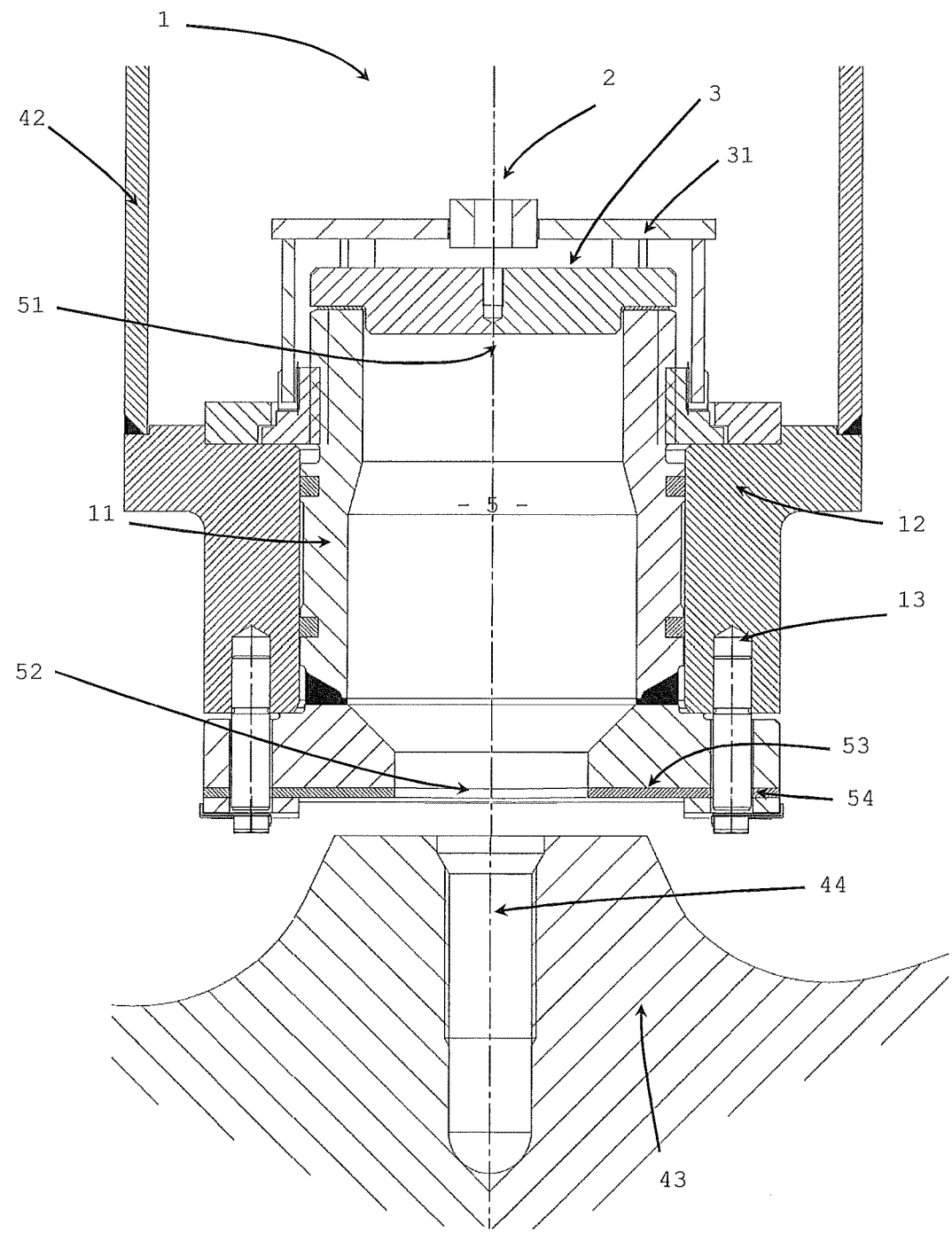
FIG. 1 shows a device according to the invention in an uncoupled position.
Figure 2:
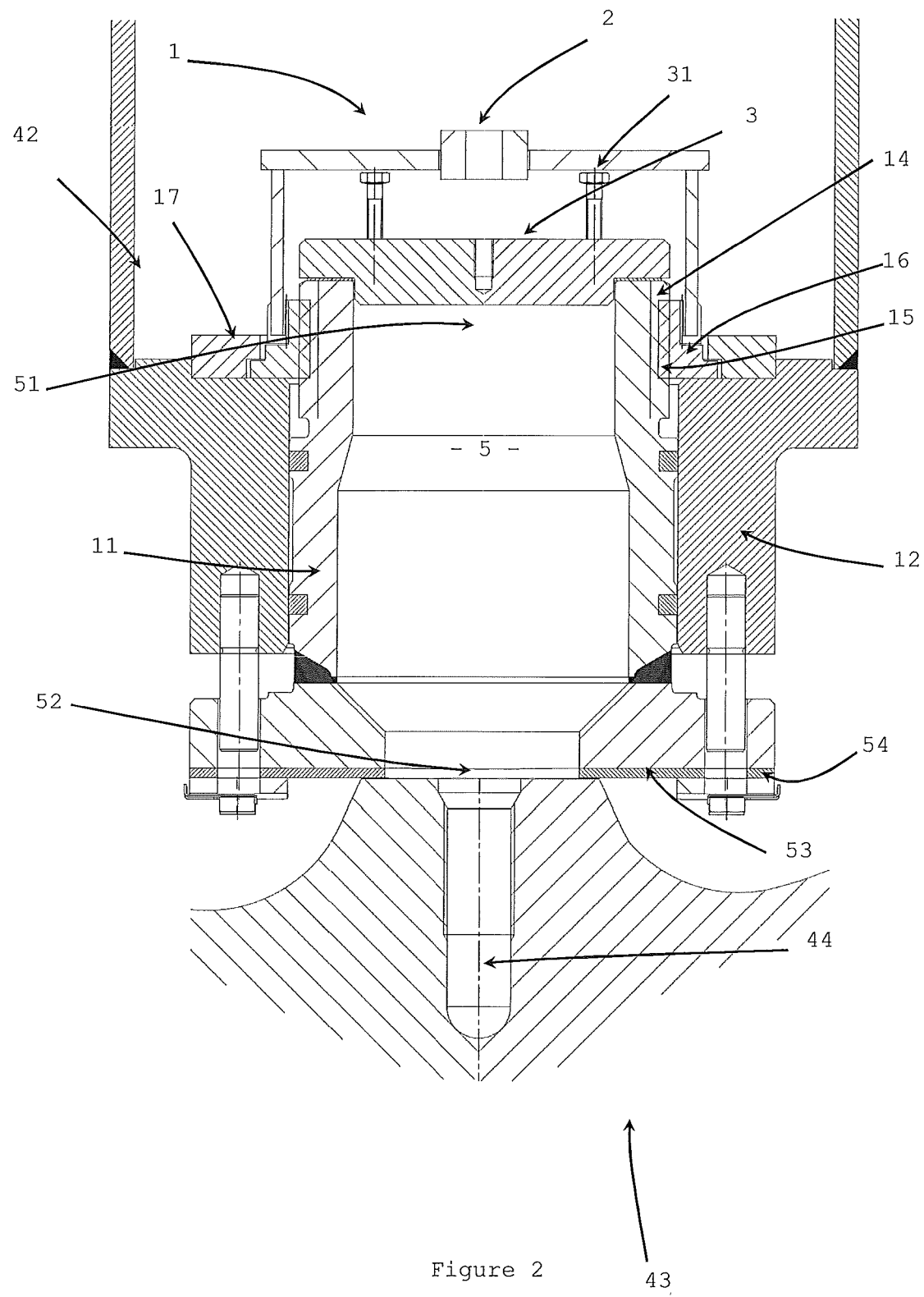
FIG. 2 shows the device in a coupled position.
Figure 3:
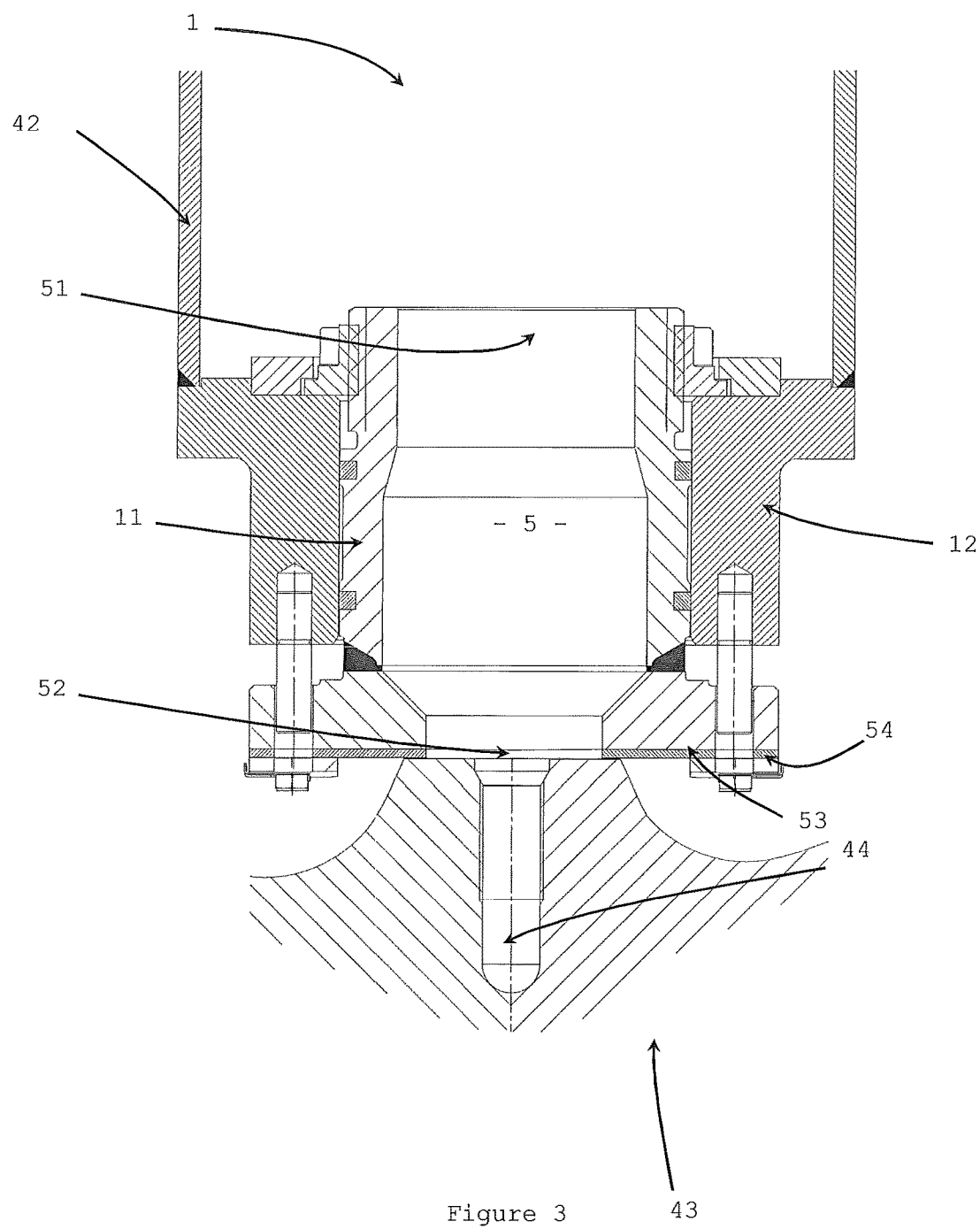
FIG. 3 shows the coupled device in the open state, capable of receiving a weight.
Figure 4:
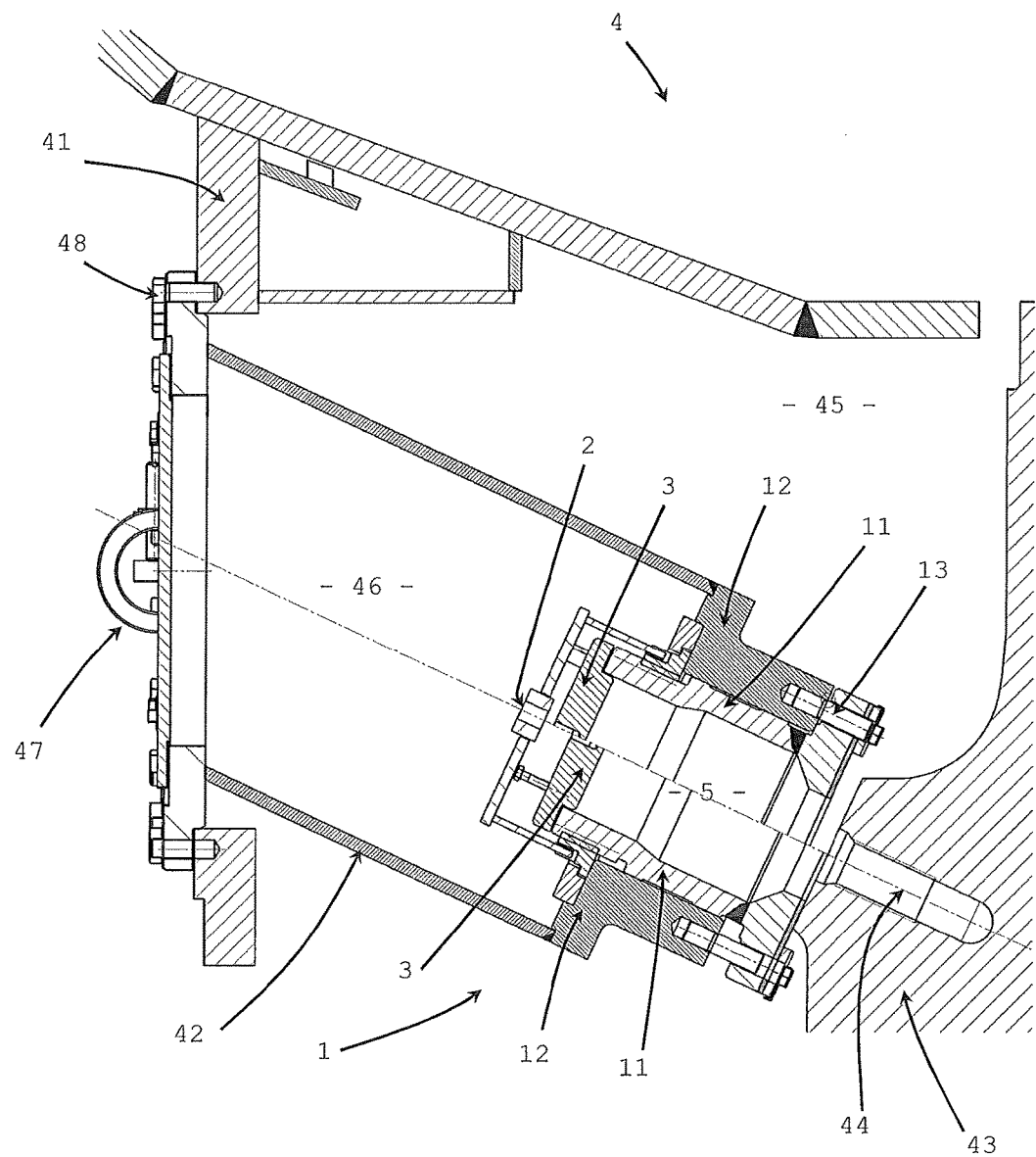
FIG. 4 shows a portion of the low-pressure turbine with the closed device partially illustrated in accordance with the disconnected position and partially in accordance with the connected position.

A turbine 4 comprises an environment 45 which is under low pressure (which can be seen in FIG. 4), that is to say, a few millibar.

For the remainder of the description, it will be assumed that the top is the outer side of the turbine 4 and the bottom is the inner side of the turbine 4.

A device 1 according to the invention principally comprises an external component 12 and an internal component 11.

The internal component 11 and the external component 12 are connected by means of a helical connection.

The external component 12 is fixed, to an external housing 41 of the turbine 4 by means of an intermediate component 42 which has a cylindrical wall.

The internal component 11 can be moved in translation relative to the external component 12 in order to be able to connect or disconnect the device 1 to/from a rotor 43 of the turbine 4 opposite a balancing hole 44. A connection component 16 is arranged on the external component 12 and is held in place by a ring 17 which is fixed to the external component 12. This connection component 16 is threaded and constitutes a nut. The threading 15 of the connection component 16 cooperates with the internal component 11 which has a complementary thread 14. The connection component 16 is actuated by means of a tool 2.

The movement of the two components 11 and 12 is carried out owing to this helical connection of the screw/nut type. The connection component 16 is turned on the external component 12, the thread 15 lowers the internal component 11 by means of the thread 14 thereof and the component 11 is fixed in terms of translation by guiding members 13. The guiding members 13 allow the internal component 11 to be held so that the rotation of the connection component 16 lowers the internal component 11. Therefore, the internal component 11 thus remains upright and does not turn.

The internal component 11 delimits a chamber 5 which has two openings: a first opening 51 located at the top and a second opening 52 located at the bottom.

The internal component 11 also has a lower surface 53 which is provided with a joint 54 at the side of the opening 52.

The lower surface 53 is the one that is placed in contact with the rotor 43 when the device 1 is connected. This joint 54 provides better sealing. The contact between the surface 53 and the rotor 43 is carried out by means of the joint 54.

The internal component 11 is closed by a cap 3. This cap 3 is held by means of retention screws which are not illustrated and two screws 31 allow it to be opened.

The balancing hole 44 is advantageously threaded at least partially by a thread (not illustrated). In this manner, when the turbine 4 is operational, the weight is inserted into the hole owing to a complementary thread and is fixed in position by means of caulking. That is to say that the external surface of the weight is hit in order to crush it in order to fix it in place and in order to be able to withstand the centrifugal force.

The cylindrical wall 42 defines a space 46 which is closed at one side by a cover 47 which is fixed to the housing 41 by means of screws 48 and at the other side by the cover 3 of the device 1.

One of the objectives of the present invention is to maintain the reduced pressure in the environment 45 when the device 1 is coupled in order to insert a weight (not illustrated) into the balancing hole 44.

When the device 1 is disconnected, the balancing hole 44 and the chamber 5 are also under reduced pressure.

In order to connect the device 1 when the turbine 4 is stopped and when the rotor 43 is orientated so that a balancing hole 44 is opposite the second opening 52 of the chamber 5, the cover 47 is opened which allows access to the cap 3, the connection component 16 is first turned, the rotation thereof brings about the translation of the internal component 11 in the external component 12. When the internal component 11 tightly abuts the rotor 43, the screws 31 are acted on in order to disengage the cap 3 from the internal component 11 in order to place the chamber 5 under atmospheric pressure and to release the balancing hole 44. It is then simply necessary to screw the weight (not illustrated) into the thread (not illustrated) of the balancing hole 44.

The contact between the lower surface 53 and the rotor 43 thus allows the reduced pressure to be maintained in the environment 45, which is further promoted by the presence of a joint 54 on this surface 53.

According to the embodiment illustrated, the joint 54 corresponds to the shape of the rotor and covers all of the surface 53, around the second opening 52.

The cylindrical wall 42 has a cross-section which is preferably identical to that of the device 1, for example, circular. It is fixed to the housing 41 of the turbine 4 by means of split pins or bolts and to the external component 12 by means of welding.

The operation is carried out in reverse order in order to return the device 1 to low pressure and to restart the turbine.

The advantage of such a device is that it can thus be readily integrated in a pre-existing turbine.

The invention claimed is:

1. A device for inserting a balancing weight into a rotor of a turbine, the device comprising:

an external component, and an internal component which is connected in a helical manner to the external component, wherein the internal component moves coaxially with respect to the external component, wherein the internal component delimits and surrounds a chamber which has a first opening and a second opening, and wherein the internal component comprises:

a lower surface provided with a sealing joint, wherein the sealing joint is at a side of the second opening; and a cap configured to close in a tight manner the first opening of the chamber.

2. The device according to claim 1, wherein the sealing joint is planar and covers at least a portion of the lower surface around the second opening of the chamber.

3. The device according to claim 1, wherein the cap is retained on the first opening of the chamber by at least two screws.

4. The device according to claim 1, further comprising at least one guiding member configured to guide the internal component relative to the external component.

5. The device according to claim 1, wherein the helical connection, between the internal component and the external component, constitutes a nut.

6. A turbine comprising:

at least one rotor which has at least one balancing hole, further comprising the device for inserting the balancing weight according to claim 1.

7. The turbine according to claim 6, wherein the device for inserting the balancing weight, is fixed to an external housing of the turbine.

8. The turbine according to claim 6, wherein the at least one balancing hole is at least partially threaded.

9. A method for inserting a balancing weight into a rotor of a turbine using a device according to claim 1, wherein the method includes the successive steps of:

stopping the turbine;

orienting the rotor so that a balancing hole is opposite the second opening of the chamber of the device;

bringing a surface of the sealing joint, at the side of the second opening of the internal component, in contact with the rotor by use of a nut;

opening the chamber of the device by acting on the at least two screws so as to remove the cap which closes the first opening of the chamber thereby filling the chamber with air;

introducing a weight into the balancing hole of the rotor via the chamber of the device, positioning the weight by means of screwing and locking the weight into position by means of caulking in the balancing hole that co-operates with a thread present on the weight;

repositioning the cap so as to close the first opening of the chamber;

using the nut to disconnect the device from the rotor; and returning the turbine into operation.

10. The device according to claim 1, wherein the sealing joint is configured to provide contact between the lower surface and the rotor.

11. The device according to claim 1, wherein the internal component is configured to move in translation relative to the external component in order to connect or disconnect the device from the rotor of the turbine.

* * * * *